United States Patent [19]
Bonnet

[11] Patent Number: 5,667,058
[45] Date of Patent: Sep. 16, 1997

[54] POWERED CONVEYOR BELT TURN

[75] Inventor: Henri Bonnet, Atlanta, Ga.

[73] Assignee: United Parcel Service of America, Inc., Atlanta, Ga.

[21] Appl. No.: 429,821

[22] Filed: Apr. 27, 1995

[51] Int. Cl.⁶ .................................................. B65G 15/02
[52] U.S. Cl. .......................... 198/831; 198/840; 198/847
[58] Field of Search .................................. 198/831, 840, 198/847, 852

[56] References Cited

U.S. PATENT DOCUMENTS

| | | |
|---|---|---|
| 393,491 | 11/1888 | Stone ................................ 198/831 X |
| 1,254,941 | 1/1918 | Snow . |
| 1,698,786 | 1/1929 | Finn . |
| 1,823,483 | 9/1931 | Bausman . |
| 2,253,913 | 8/1941 | Paterson . |
| 3,027,852 | 4/1962 | Key . |
| 3,044,603 | 7/1962 | Fry . |
| 3,153,475 | 10/1964 | Swanson . |
| 3,237,754 | 3/1966 | Freitag, Jr. et al. ................ 198/182 |
| 3,358,811 | 12/1967 | Gerrish . |
| 3,951,256 | 4/1976 | Gurewitz . |
| 4,180,158 | 12/1979 | Frederick . |
| 4,185,737 | 1/1980 | Blattermann . |
| 4,227,610 | 10/1980 | Gerdes et al. . |
| 4,241,822 | 12/1980 | Molins et al. . |

FOREIGN PATENT DOCUMENTS

| | | |
|---|---|---|
| 98227 | 1/1984 | European Pat. Off. ............ 198/831 |
| 2447878 | 10/1980 | France . |
| 1 803 529 | 5/1970 | Germany . |
| 2611354 | 9/1977 | Germany . |
| 0140411 | 6/1986 | Japan . |
| 0145027 | 7/1986 | Japan . |
| 319530 | 12/1993 | Japan ................................ 198/831 |
| 0575082 | 10/1977 | U.S.S.R. . |
| 0589958 | 1/1978 | U.S.S.R. . |
| 2035943 | 6/1980 | United Kingdom ................ 198/831 |
| 2063201 | 6/1981 | United Kingdom ................ 18/831 |
| WO 82/02870 | 9/1982 | WIPO . |

*Primary Examiner*—Frank E. Werner
*Attorney, Agent, or Firm*—Jones & Askew, LLP

[57] ABSTRACT

A powered belt turn (10) for conveying parcels, objects and the like through an arcuate path from an input conveyor to an output conveyor. The powered belt turn (10) comprises a frustoconically shaped conveyor belt (15) which is supported for rotation through an arcuate path about angularly displaced end rollers (56). The conveyor belt is selectively and preferentially stiffened by reinforcing stays adapted to the conveyor belt structure. A motor (74) is operatively attached to an end roller causing the end roller to rotate thereby rotating the conveyor belt. The conveyor belt is supported on a belt support plate (28) and maintained in engagement with the end rollers by a belt retainer. In a first embodiment, the belt retainer is a sheave belt retainer (12) comprising sheaves (96, 98) adapted to engage an inner edge (36) of the conveyor belt and to urge the conveyor belt into engagement with the end rollers. In a second embodiment, the belt retainer is a track belt retainer (112) comprising an arcuate track (150) having a track groove (152). Ball casters (39) are adapted to the reinforcing stays (40) extending from the inner edge of the conveyor belt. The arcuate track is urged into engagement with the ball casters thereby causing a retaining force to be transmitted to the conveyor belt to urge the conveyor belt into engagement with the end rollers.

23 Claims, 7 Drawing Sheets

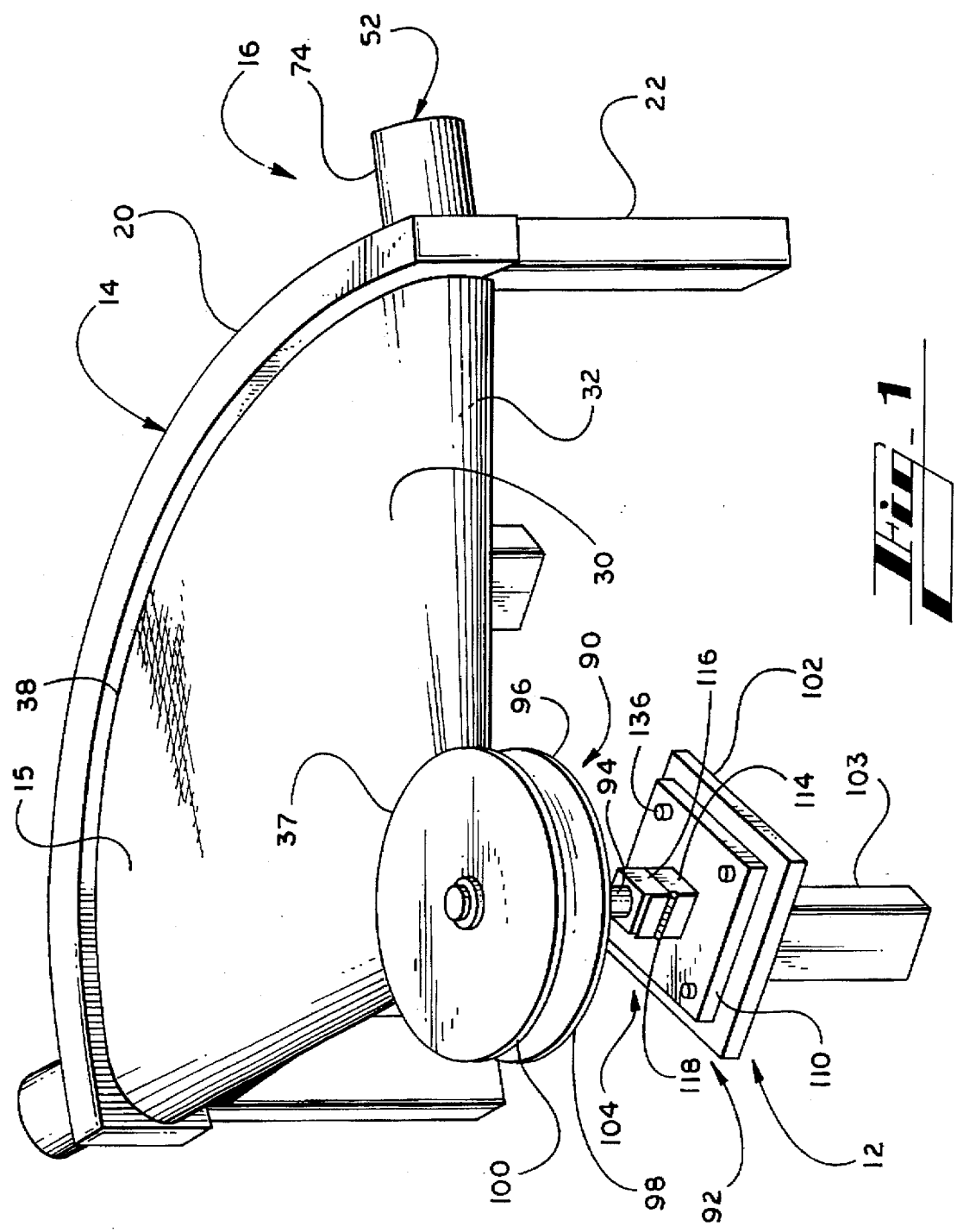

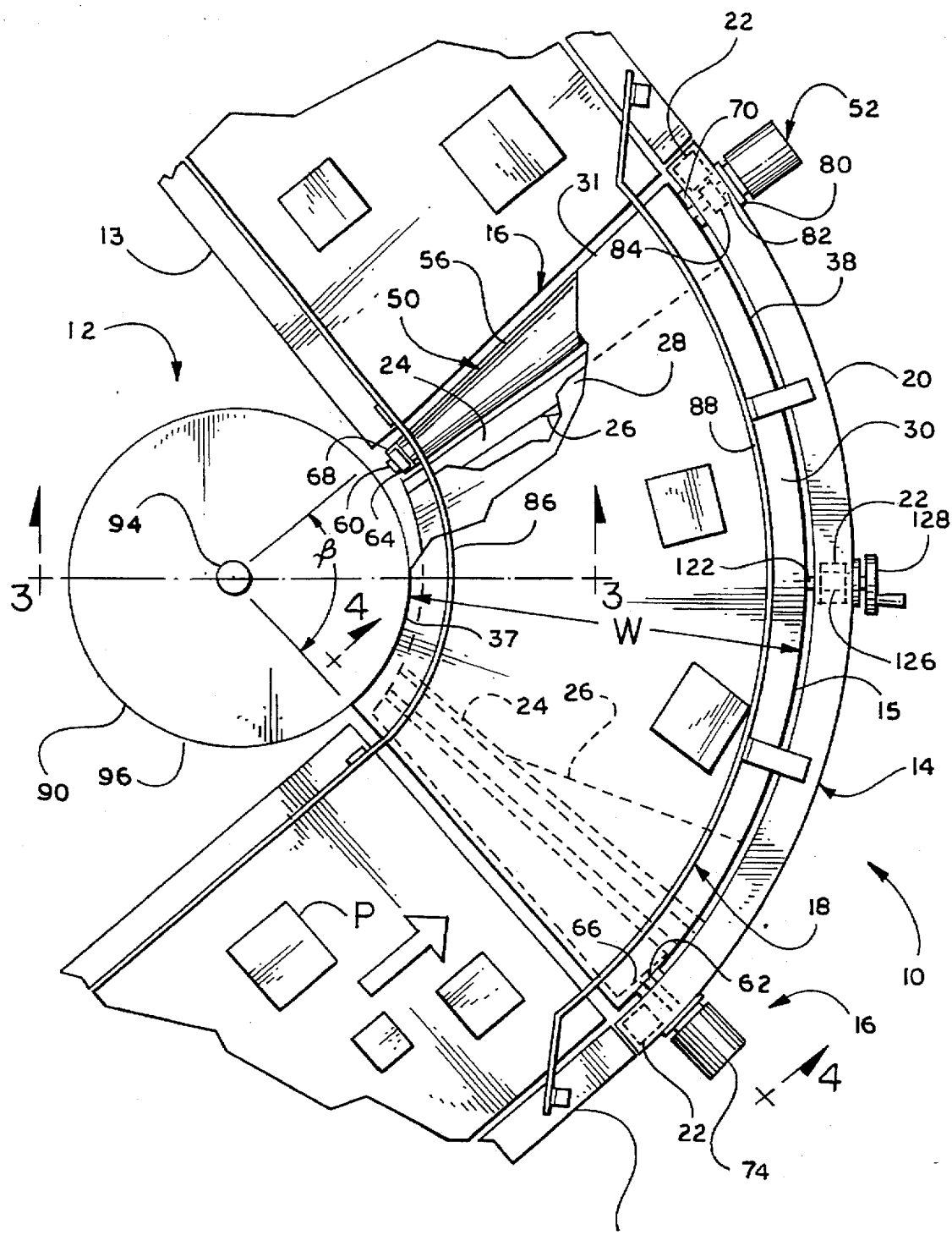
Fig_2

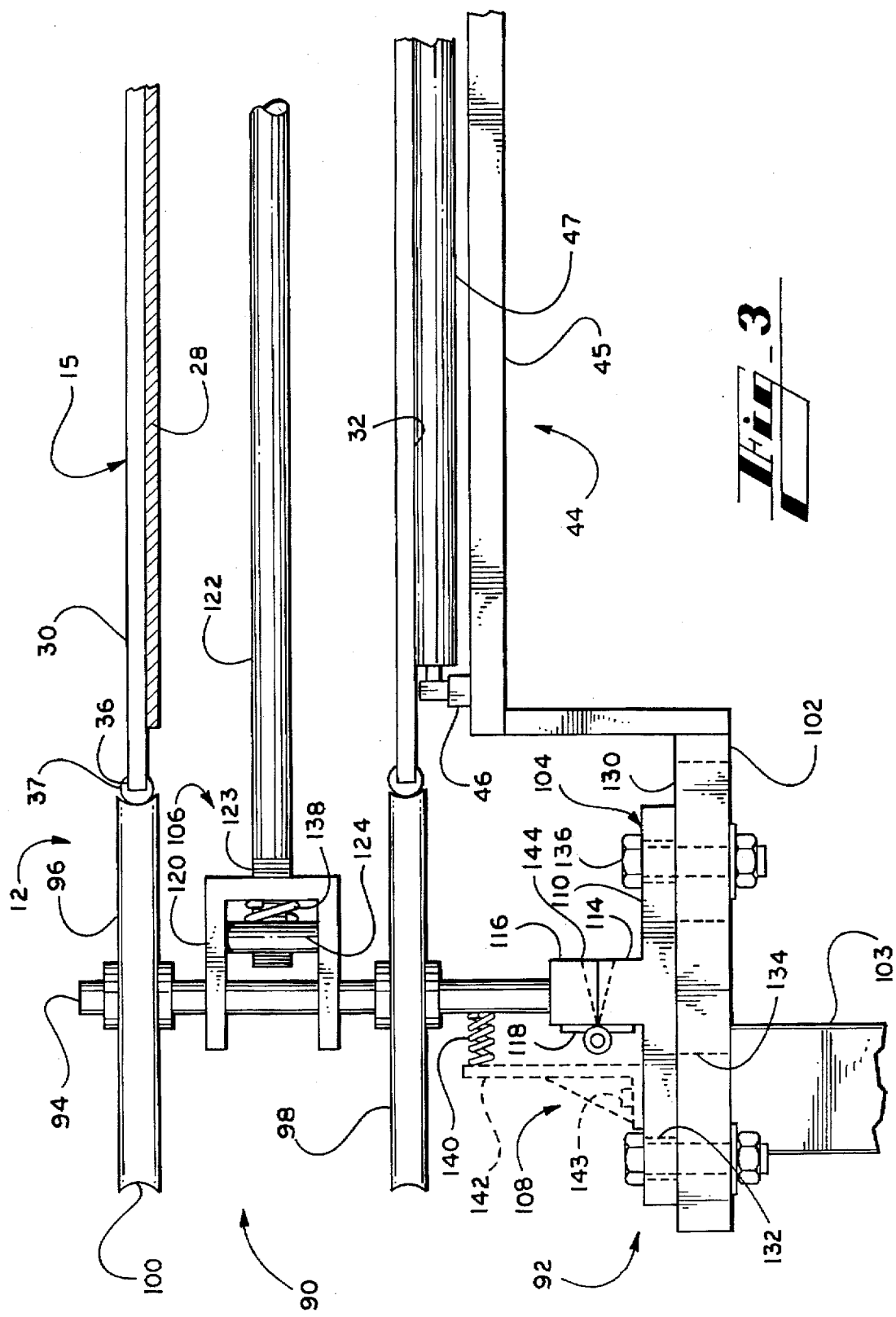
Fig_3

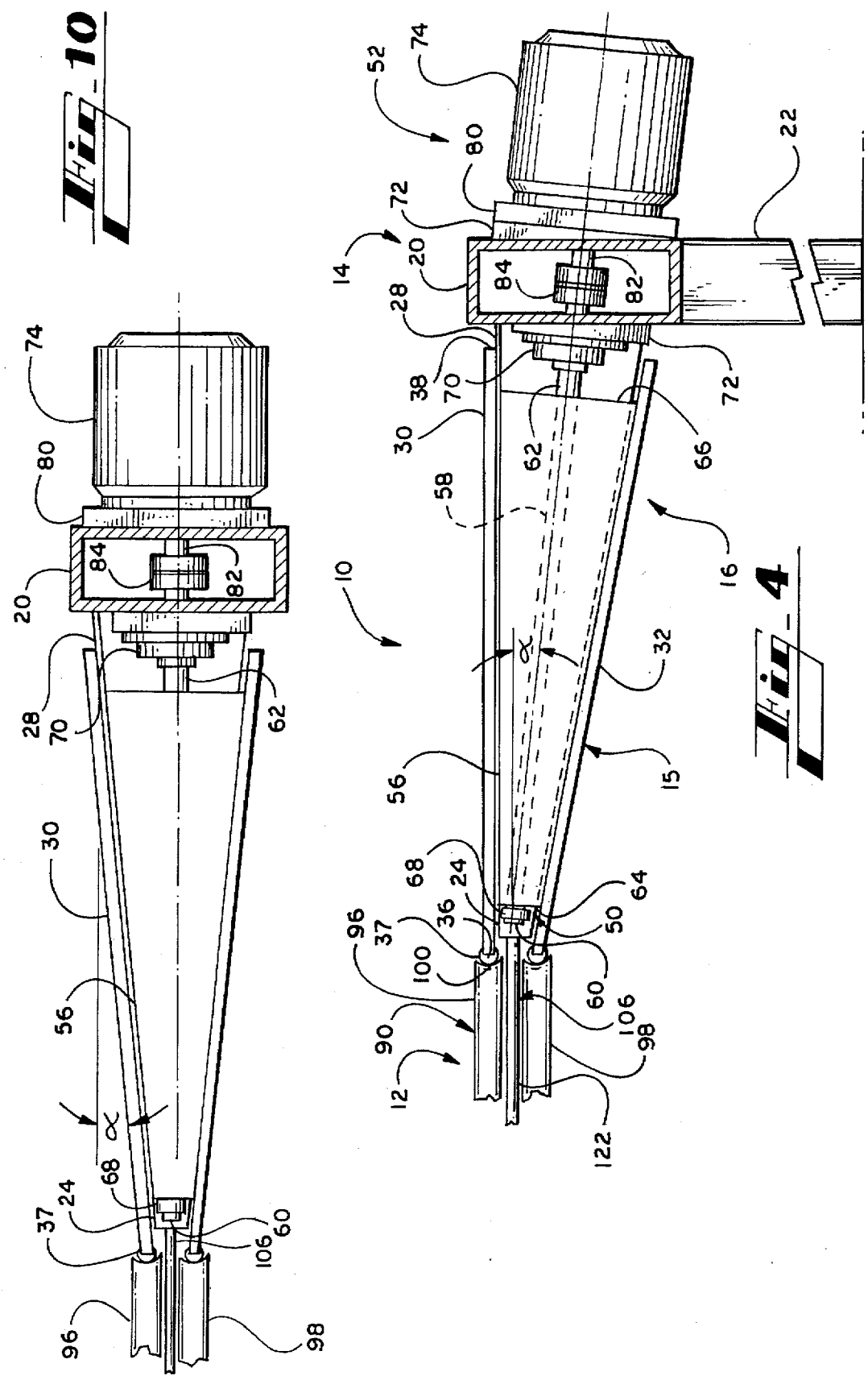

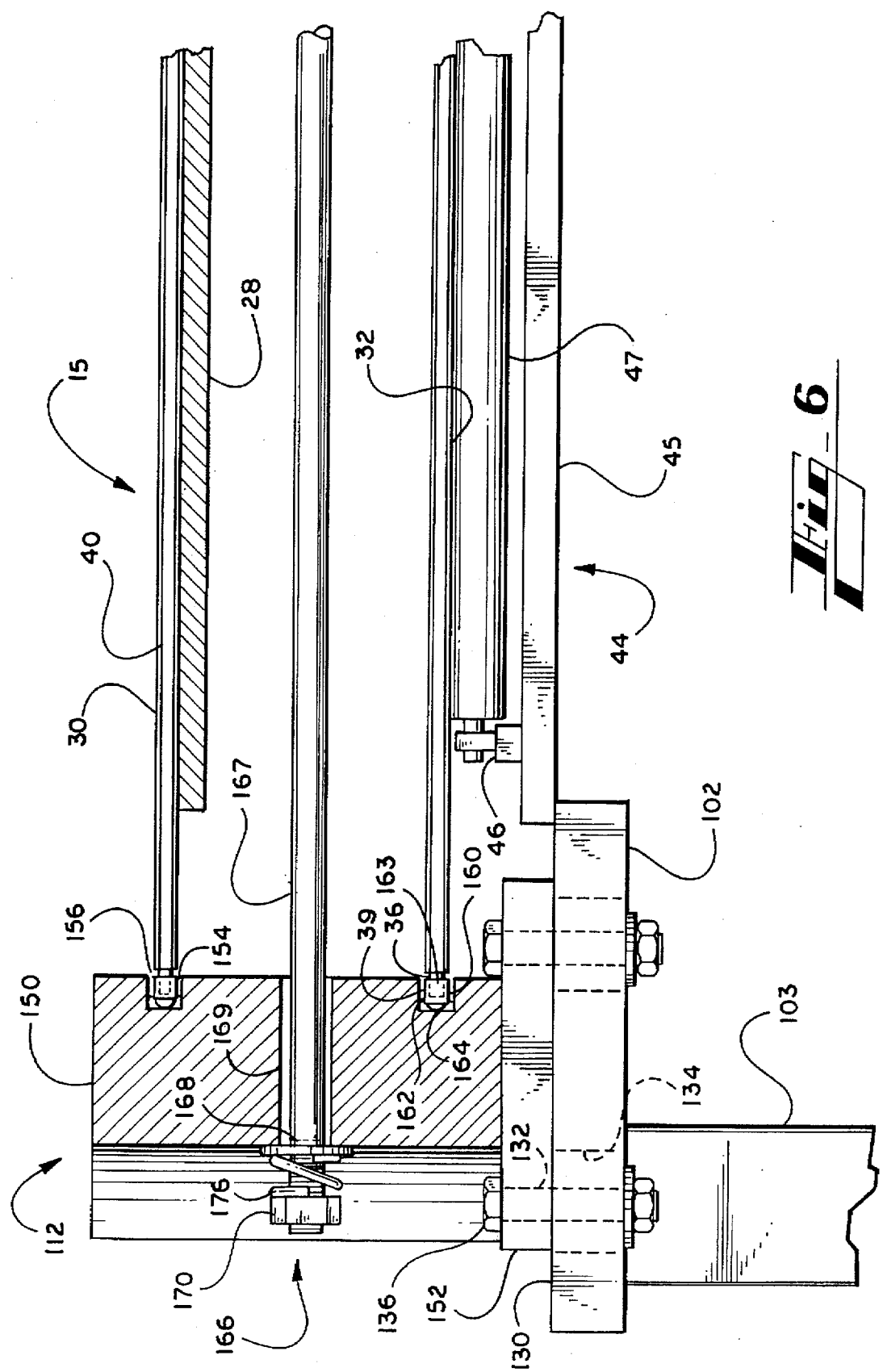

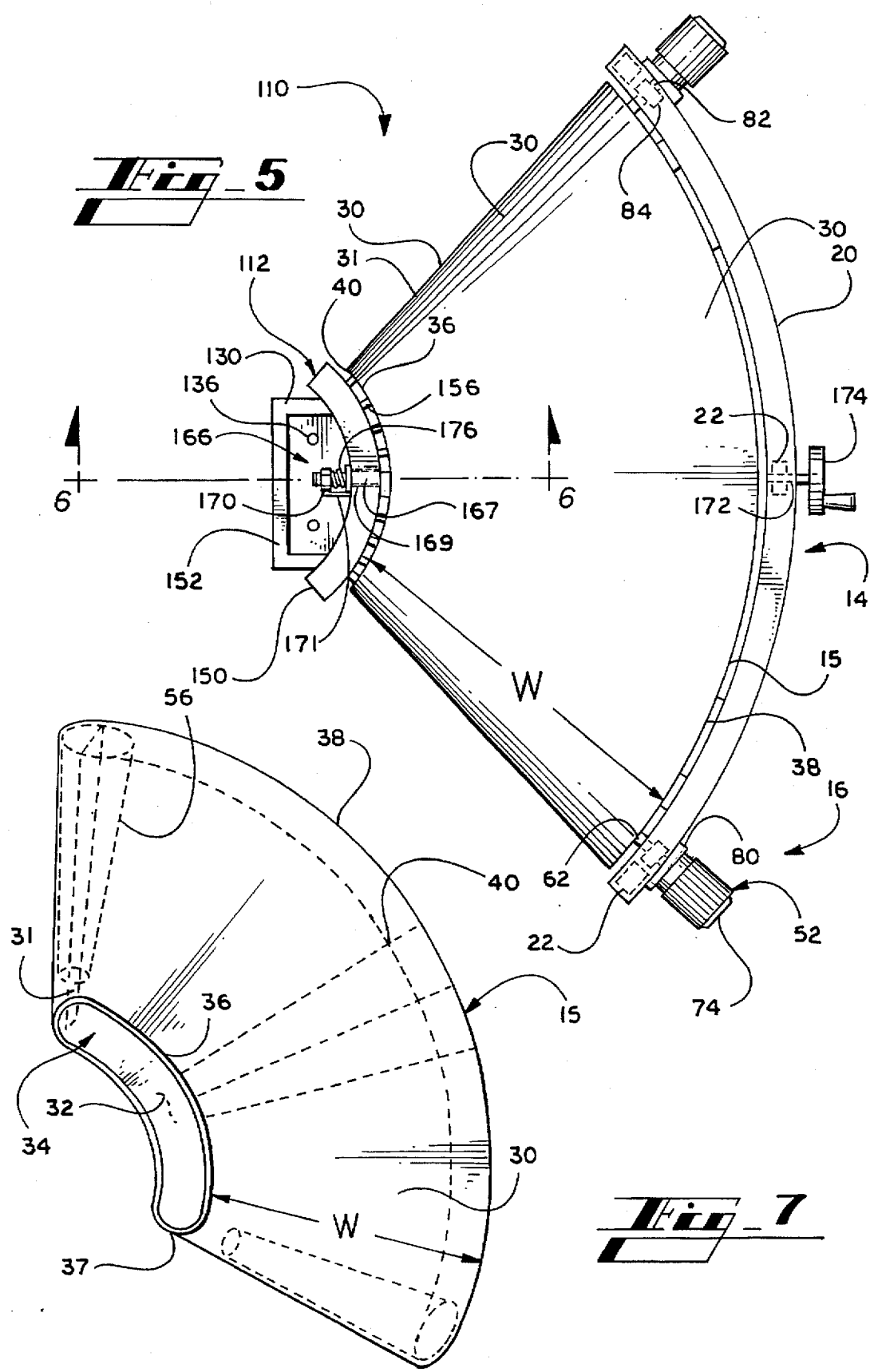

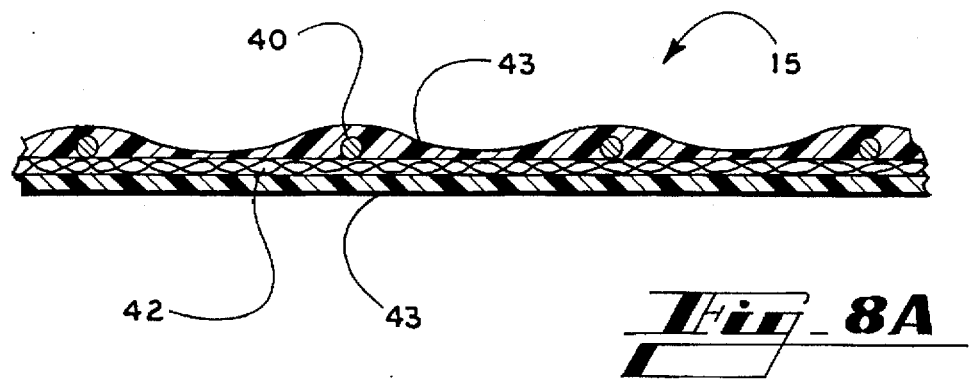
Fig_8A
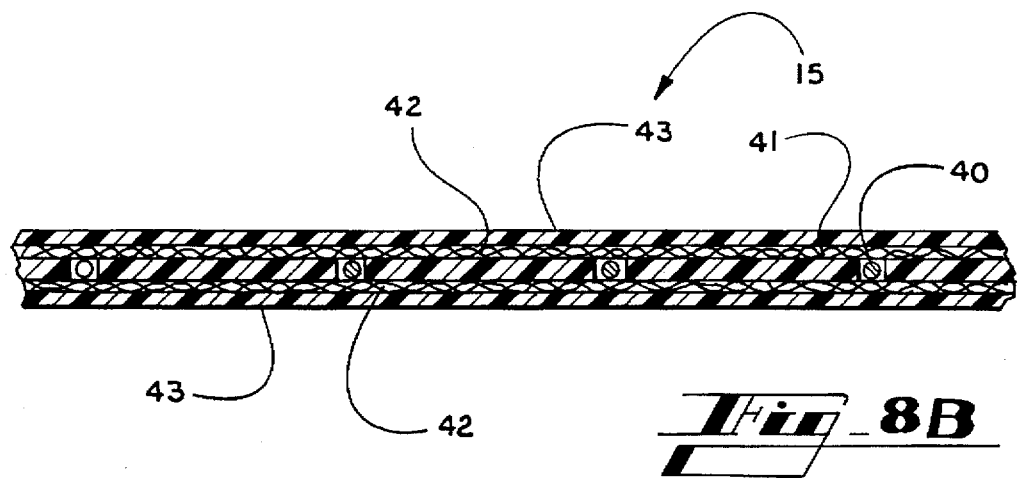
Fig_8B
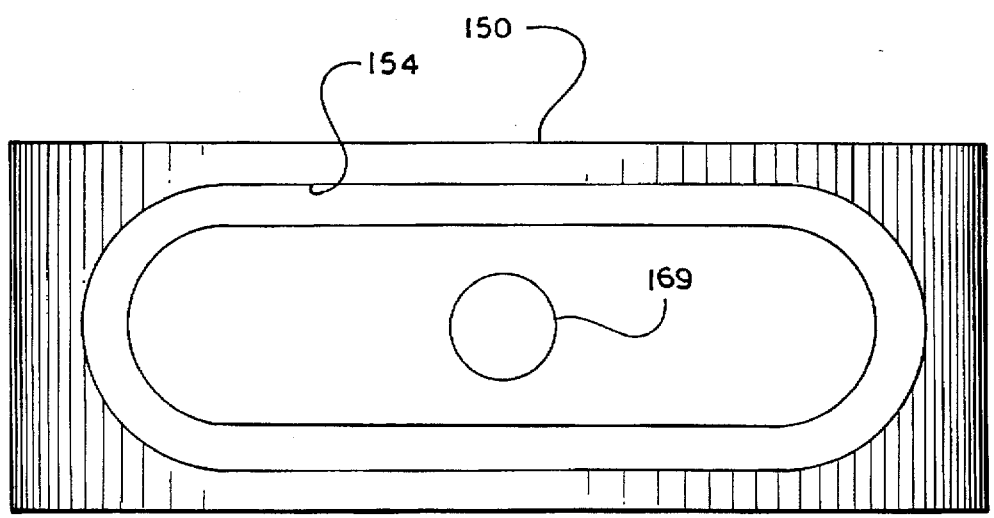
Fig_9

POWERED CONVEYOR BELT TURN

TECHNICAL FIELD

The present invention relates to conveyors for transporting objects, and more particularly to a powered conveyor belt turn for conveying objects from a conveyor oriented in a first direction to a conveyor oriented in a second direction.

BACKGROUND OF THE INVENTION

Conveyors comprising endless conveyor belts have long been used for transporting parcels, articles or objects. Conveyors are used for moving objects, such as parcels or parts, through a sorting facility, a manufacturing plant or an assembly plant for example.

There is often a need to transport articles from a first conveyor to a second conveyor, where the first and second conveyors are not longitudinally extending from one another. For example, it is not uncommon for two straight conveyor runs of a conveying system to be perpendicularly oriented to each other, such as where, due to building size and/or space constraints, the conveyor sections cannot extend fully longitudinally. Specialized curved conveyor sections are used to connect the output end of the first conveyor section to the input end of the second conveyor section. Curved conveyors known in the prior an have angular paths extending between offsets of only a few degrees to curved conveyors extending through a 180 degree angular path.

Conveyor turns are usually powered so that the material moves through the curved conveyor section from the first or input conveyor to the second or output conveyor section. Power to cause the curved conveyor belt to rotate is coupled to the belt through a variety of means. Powered end rollers are commonly used to cause the belt to rotate. Or the belt can be pinched at a belt edge between a rotating capstan and pinch roller. Other conveyor belts for powered belt turns may be driven at the center of the conveyor belt.

There are numerous patents relating to powered belt turns in conveyor systems. For example, in U.S. Pat. No. 3,951,256, issued to Gurewitz, an endless, arcuate shaped conveyor belt carries articles around curves in a conveyor system. The arcuate conveyor belt is supported for rotation between two end rollers and a bed supports the conveyor belt in a horizontal plane. One of the end rollers is chain driven by a motor located beneath the belt turn, thus causing the belt to rotate about the end rollers. Another powered belt turn is set forth in U.S. Pat. No. 3,044,603 issued to Fry. In Fry, a frusto-conically shaped conveyor belt is mounted for rotation between end rollers. The conveyor belt is powered by a shaft driven end roller in a manner similar to the Gurewitz device. Still another patent showing a powered belt turn is Russian patent No. 575,082. In the Russian patent, a cone shaped conveyor belt is supported for rotation by a fixture at the center of the conveyor belt. The cone shaped belt is also supported by angularly displaced tension rollers and is driven to provide a powered belt turn.

When tapered rollers are used at the ends of the belt turn where the belt reverses direction, the moving belt tends to creep down the taper. The prior art powered belt turns discussed above describe different means for maintaining the conveyor belt on the end rollers. In Gurewitz, roller guides, which are attached to an inside surface of the conveyor belt, ride in an arcuate, grooved member that is mounted between upper and lower belt runs. In Fry however, the conveyor belt is maintained in position on the end rollers by a chain extending peripherally about the belt edge and a tongue assembly which attaches the chain to the outer periphery of the conveyor belt. The chain is guided by an angled guide fabricated of low friction material. In the Russian patent, the cone shaped belt is supported in contact with angularly displaced tension rollers by the fixture. The cone shaped belt is shown clamped to the fixture by a cone shaped plug and bolt assembly; thus, the cone shaped belt is not moveable axially with respect to the tension rollers.

Another approach for maintaining the curved belt in position on the conveyor turn known in the prior art, includes applying a bead to the outer periphery of a frusto-conically shaped conveyor belt. The conveyor belt's outer periphery is then positioned within a roller guide assembly that extends adjacent the outer conveyor belt periphery and captures the bead between cooperating pairs of rollers. Depending on the size of the belt turn, there could be a hundred or more cooperating pairs of rollers necessary to maintain the conveyor belt in position as it turns.

These prior an devices for maintaining the conveyor belt in position on a powered belt turn tend to be mechanically complicated, noisy and expensive. They also require high maintenance and have been found to wear rapidly, requiring frequent adjustment and replacement. The curved conveyor belts also tend to be difficult to adjust or replace. When adjustment becomes necessary, the belt turns of the prior art must often be shut down while making the adjustments. When a belt is damaged to such an extent that replacement is required, substantial machine disassembly is necessary to be able to remove and replace the damaged belt. Thus, a typical consequence of having to replace a belt is considerable machine down-time.

Therefore, it would be desirable to have a powered belt turn that has an inexpensive and mechanically simple means for maintaining the curved conveyor belt in position on the belt turn. Furthermore, there is a need for a powered belt turn that can be operated at high belt speeds and high belt loading. There is also a need for a powered belt turn which allows the curved belt to be easily changed without significant machine disassembly or machine down-time.

SUMMARY OF THE INVENTION

That the present invention accomplishes these objects and overcomes the above described drawbacks of the prior art will be apparent to those skilled in the art from the detailed description of the preferred embodiment to follow.

Generally described, the present invention is a powered belt turn positioned to transfer parcels between an input conveyor and an output conveyor.

More particularly described, the powered belt turn of the present invention comprises a frusto-conically shaped conveyor belt which defines a central aperture and has an inner belt edge adjacent the central aperture. The conveyor belt provides an upper carrying side for supporting material placed on the powered belt turn. The conveyor belt is supported by spaced apart, angularly aligned end rollers and a conveyor belt retainer, engagable with the conveyor belt adjacent the central aperture, for urging the conveyor belt into supported engagement with the end rollers while permitting relative movement between the retainer and the inner belt edge.

In one embodiment of the present invention the conveyor belt is stiffened with a plurality of stays extending radially from the central aperture toward the outer periphery of the conveyor belt. A flexible reinforcing bead is attached to or formed at the inner belt edge adjacent the central aperture. The conveyor belt is supported about the end rollers and the conveyor belt retainer, comprising a sheave assembly, engages the bead to apply a force to the bead to urge the conveyor belt into engagement with the end rollers at a selected location.

In an alternative embodiment of the present invention stay bearings are mounted to the stays and extend from the stays outwardly from the inner belt edge. The stay bearings are adapted to engage the conveyor belt retainer which comprises an annular track shaped to receive the bearings. The conveyor belt retainer is adapted to apply a retaining force to the belt stays to cause the conveyor belt to engage the end rollers at a predetermined location.

Thus, it is an object of the present invention to provide an improved powered belt turn.

It is another object of the present invention to provide a powered belt turn having an improved means for maintaining a conveyor belt at a selected location on belt turn end rollers.

It is a further object of the present invention to provide a powered belt turn which can be operated at high speeds and high loads.

It is another object of the present invention to provide a simplified powered belt turn wherein the conveyor belt is easily changed.

It is still another object of the present invention to provide a powered belt turn wherein the position of the conveyor belt relative to the belt turn end rollers is adjustable to maintain the conveyor belt in proper relation to the end rollers.

Other objects, advantages and features of the present invention will be more readily understood from the following detailed description of specific embodiments thereof when read in conjunction with the accompanying drawings.

BRIEF DESCRIPTION OF THE DRAWINGS

FIG. 1 is a pictorial view of a powered belt turn of the present invention shown with a sheave belt retainer;

FIG. 2 is a top view, shown in partial cut-away, of the powered belt turn shown in FIG. 1;

FIG. 3 is a cross-sectional side view taken along line 3—3 of FIG. 2, showing the sheave belt retainer and positioning arrangement;

FIG. 4 is a cross-sectional side view taken along line 4—4 of FIG. 2, showing portions of the belt drive system;

FIG. 5 is a top view of a second embodiment of the powered belt turn of the present invention, showing a track belt retainer;

FIG. 6 is a cross-sectional side view taken along line 6—6 of FIG. 5, showing the track belt retainer and tensioning arrangement;

FIG. 7 is a perspective view of an embodiment of the conveyor belt of the present invention;

FIG. 8a is a cross-sectional side view perpendicular to reinforcing stays of a first embodiment of a stiffened belt;

FIG. 8b is a cross-sectional side view perpendicular to reinforcing stays of a second embodiment of a stiffened belt;

FIG. 9 is a front view of a track belt retainer; and

FIG. 10 is a cross-sectional side view, similar to FIG. 4, with the conveyor belt shown in a banked configuration.

DETAILED DESCRIPTION OF THE DRAWINGS

Turning next to the Figures in which like numerals indicate like parts, the preferred embodiment of the present invention will now be described.

Looking now at FIG. 1 them is shown a first embodiment of a powered belt turn 10 of the present invention. The powered belt turn 10, shown in FIG. 1, includes a sheave belt retainer 12. A second alternative embodiment of the powered belt turn 110 is shown in FIG. 5 and includes a track belt retainer 112.

The belt turns 10 and 110 shown in FIGS. 1 and 5 are substantially identical except for the particular belt retainer, 12 or 112, employed and the portion of the conveyor belt 15 that engages the retainer. The elements in common among the two embodiments will be described first. Descriptions of the features unique to the embodiments, such as the belt retainers 12 and 112, will then be described, individually.

In FIG. 2, packages P are shown being moved onto the powered belt turn 10 by an input conveyor 11 and taken away by an output conveyor 13. The belt turns 10 and 110 shown in the figures depict ninety degree powered belt turns. It will be understood by those skilled in the an of conveyor devices, that other angular displacements, between zero and 180 degrees, may be accommodated by the present invention without departing from the inventive features presented herein.

Looking at FIGS. 1 and 2, it will seen that the belt turn 10 further includes a support frame 14, a frustoconically shaped conveyor belt 15 and a belt drive system 16. A guide rail assembly 18 is adapted to the belt turn 10 to guide packages P about the belt turn 10.

The support frame 14 includes an arcuate shaped frame beam 20 located at the outer periphery of the belt turn 10. The frame beam 20 is shown fabricated of steel tubing having a rectangular cross-sectional configuration in FIG. 4. The arcuate configuration of the frame beam 20 defines a center of curvature located approximately at the center of rotation of the sheave retainer 12. The center of curvature of the frame beam 20 in the embodiment shown in FIG. 5 is at the center of curvature of the track retainer 112. The arcuate shape of the frame beam 20 is provided by bending a straight section of rectangular tubing in a bending roller. Other methods for providing the arcuate shape are well known.

The frame beam 20 is supported by a plurality of vertical frame legs 22 that attach to the primary beam 20 at the midsection and adjacent the opposed ends. The frame legs 22 are supported upon a support surface such as a floor.

A pair of cantilevered roller support beams 24 extend radially inwardly from adjacent opposed ends of, the frame beam 20. The roller support beams 24 preferably are tapered from their points of attachment at the frame beam 20 to their inner ends which allows the roller support beams 24 to be placed between the opposed sides of the conveyor belt 15. By placing the roller support beams 24 between the opposed sides of the conveyor belt 15, the belt turn 10 is made more compact. Roller support beam gussets 26 attach to the frame beam 20 and the roller support beam 24 to prevent flexure of the cantilevered roller support beams 24 under the influence of conveyor belt tension. The gussets 26 comprise metal plates cut in the shape of triangles that are attached, typically, by welding.

A belt support plate 28, shown in FIGS. 2–4 and 6, is mounted to the upper aspect of the support frame 14 and extends between the roller support beams 24 and the support beam 20. The belt support plate 28 is attached to the roller support beams 24 and the support beam 20 by conventional means including rivets, screws or welding. The belt support plate 28 supports the conveyor belt 15 and packages P loaded on the belt turn 10. The belt support plate 28 also stiffens the support frame 14 to resist frame flexure under the influence of conveyor belt tension.

The conveyor belt 15 is supported for rotation about the belt turn 10 by the belt drive system 16. The belt drive system 16 includes a pair of end roller assembly 50, a motor drive assembly 52 and a return roller assembly 44.

Looking at FIGS. 2 and 4, it is shown that each of the end roller assemblies 50 includes an end roller 56 supported for rotation by the roller support beam 24. In the embodiments shown in the figures, the end rollers 56 are tapered rollers defining a taper angle $\alpha$, shown in FIG. 4. A roller shaft 58 extends through the roller 56. The roller shaft 58 includes opposed shaft ends, 60 and 62, which extend past opposed ends, 64 and 66, respectively, of the end rollers 56. Shaft end 60 is supported for rotation in a pillow block bearing 68 which is mounted to the roller support beam 24 opposite the support beam 20. Shaft end 62 extends through and is supported for rotation by a flange bearing 70 mounted to the support beam 20.

It is informative to note that the linear velocity of any point on the conveyor belt 15 varies with the radial position of the point, the linear velocity increasing as the radial distance of the point from the belt retainer increases. Thus, the linear velocity of a point located at the inner edge 36 is slower than a point located at the peripheral edge 38, at which point the velocity is greatest. Because the linear velocity varies with the radius, a solid, fixed diameter end roller, if used with the belt turn of the present invention, would slip with respect to the rotating conveyor belt 15, over substantially the entire length of the fixed diameter, solid end roller. This is because points located on the fixed diameter end roller rotate at the same speed. Therefore, a tapered end roller 56 is used because the linear velocity of points along the length of the tapered end roller 56 increase from the apex of the roller to the base of the roller. The taper angle $\alpha$ of the tapered end roller 56 is defined so that the velocity profile of the conveyor belt 15 across its width W corresponds to the velocity profile of the end roller 56.

A fixed diameter end roller may be used with the belt turn 10 provided this alternative end roller comprises a roller shaft upon which is mounted a plurality of separate idler rollers all capable of rotating independently of adjacent rollers. For example, a shaft may have mounted on it a series of twenty bearings each having equal diameter inner and outer races. The roller mounted at the shaft end supported adjacent the belt retainer 12, for example, is capable of rotating at a slower speed than the roller mounted to the shaft adjacent the support beam 20, which rotates the fastest of all the rollers mounted on the shaft. This type of end roller arrangement is not easily adaptable to belt drive systems wherein the end rollers are driven. With these end roller arrangements, so called "wringer" drive systems are used to rotate the conveyor belt. A wringer drive system comprises a driven roller and a cooperating idler roller. A portion of the conveyor belt, such as adjacent the peripheral edge, is pinched between the driven roller and the idler roller thereby causing the belt to rotate. Because of the limited engagement of the wringer drive system with the conveyor belt, the rotating forces capable of being transferred to the conveyor belt are limited, thus reducing the load carrying capacity of belt turns utilizing wringer type drive systems. There may be some applications where this alternative drive system is better suited, however.

The end rollers 56 are mounted so that the upper edge of the roller 56 is substantially horizontal so that an upper carrying side 30 of the conveyor belt 15 is supported substantially horizontally. Cooperating angle plates 72 are first mounted to the support beam 20 to accommodate the orientation of the roller shaft 58 axis inclined below the horizontal. It is to be understood that the end roller 56 may also be arranged so that the rotational axis of the roller 56 is substantially horizontal resulting in a banked belt turn, shown in FIG. 10. When the rotational axis is disposed in a horizontal plane, the upper carrying side 30 of the conveyor belt 15 lies in a plane elevated from the horizontal an amount equal to the taper angle $\alpha$. Particular applications of the belt turn 10 may prescribe different orientations of the rollers 56 and the upper carrying side 30.

Each of the motor drive assemblies 52 includes a roller drive motor 74 which is mounted to the support beam 20 and drivingly engages the end roller 56. In the preferred embodiment of the present invention, the motors 74 are variable speed, reversible motors. Where the belt turn 10 is to be used in only one turn direction, then only one roller 56 need be a driven roller. Therefore, only one motor 74 is needed and that motor would be mounted such that it drives the end roller 56 so that the upper carrying side 30, of the conveyor belt 15, is under tension when the conveyor belt 15 is rotated about the belt turn 10. Thus, the conveyor belt 15 is "pulled" rather than "pushed" by the driven end roller 56. Where the belt turn 10 is to be capable of being run in both a clockwise and counterclockwise direction, i.e., the rotation direction is reversible, two motors 74, one mounted to each of the end rollers 56, are needed. Both motors 74 may also be used in tandem to cause the conveyor belt 15 to rotate in a single direction. With two motors 74, the conveyor belt 15 can always be in tension along the upper carrying side 30 regardless of the belt turn direction. The motors 74 may be AC or DC motors. Appropriate speed controls, motor reversers and motor speed synchronizers are adapted to operate the motors 74.

Each motor 74 includes a motor mounting flange 80 which mounts the motor to the support beam 20. Where the tapered end rollers 56 are mounted so that the upper edge is supported in a horizontal plane, the angle plate 72 is used to accommodate angular offset of the mounting flange 80 to the support beam 20. Each drive motor 74 includes a motor shaft 82 which is coupled to the roller shaft end 62 through an intermeshing lug motor coupling 84 commonly referred to as a "Lovejoy" coupling. Other coupling devices may be employed.

A plurality of return roller assemblies 44, one of which is shown in each of the FIGS. 3 and 6, is mounted below the support frame 14. The return roller assemblies 44 support a return side 32 of the conveyor belt 15 in a substantially horizontal orientation to prevent belt sagging and to enhance the engagement of the conveyor belt 15 with the belt retainer 12 or 112. The return roller assemblies 44 are mounted to the belt turn 10 and spaced evenly between the end rollers 56. Each return support roller assembly 44 includes a mounting arm 45 attached to and supported between the support beam 20 and potions of the belt retainer 12 or 112. The mounting arm 45 mounts opposed pillow block bearings 46, only one of which is shown in FIGS. 3 and 6. The pillow block bearings 46 support a roller 47 for rotation between the pillow blocks 46.

The conveyor belt 15 is frustoconically shaped and is disposed in a flattened configuration when supported for rotation by the belt drive system 16, as shown in FIG. 7. When disposed about the end rollers 56, the conveyor belt 15 defines transition portions 31. The transition portions 31 of the conveyor belt 15 are those portions of the conveyor belt 15 which engage the end rollers 56 as the conveyor belt 15 turns. Thus, the conveyor belt 15 "transitions" from the upper carrying side 30 to the lower return side 32 at the output end of the belt turn 10, and, from the lower return side 32 to the upper carrying side 30 at the input end of the belt turn 10.

The conveyor belt 15 may be fabricated as a pre-formed, single piece belt; however, this is quite expensive since the loom on which the pre-formed conveyor belt is made would have to be set-up for the particular belt dimensions. Alternatively, frustoconically shaped conveyor belts are typically fabricated of individual wedge-shaped segments of belting material that are attached one to another to form a closed, frustoconical belt of predetermined dimensions. The wedge segments are fastened to one another by sewing, gluing, welding or by other means that are well known in the art. A frustoconically shaped conveyor belt may also be fabricated by cutting a doughnut shaped disk from a square sheet of belting material. Then, a wedge shaped segment of the disk is removed thereby creating opposed exposed disks ends. The exposed disk ends are then brought together, forming a frustoconically shaped conveyor belt. The exposed disk ends are then secured to each other by conventional means. The resulting conveyor belt 15 defines a central aperture 34 having an inner belt edge 36.

The inner belt edge 36 is provided with a bead 37, shown in FIG. 3, when the conveyor belt 15 is used on a belt turn 10 having a sheave belt retainer 12. The bead 37 may be formed as an integral part of the conveyor belt 15 adjacent the inner edge 36 while the belt is being fabricated. The bead 37 may, alternatively, be formed independently of the conveyor belt 15 and then attached by mechanical means including sewing, or by thermal bonding to the conveyor belt 15 adjacent the edge 36. When the conveyor belt 15 is used on a belt turn 10 having a track belt retainer 112, ball casters 39, shown in FIG. 6, are adapted to the inner belt edge 36 as is explained in greater detail below. The conveyor belt 15 also includes an outer peripheral edge 38 and defines a belt width W.

As is shown in FIGS. 8a and 8b, the conveyor belt 15 comprises a fabric core 42 which may be fabricated of woven polyester or a composite structure including reinforcing strands of aramid fiber, for example. The woven fabric core 42 is then impregnated with a polymer resin 43, such as urethane or molten polyester, which is applied such that a desired belt thickness is achieved. The bead 37, if a separate part attached to the belt, may be formed of urethane or polyester. Separately formed beads 37 (not shown) would preferably be provided with an integral attaching web, a potion of which is molded into the bead and another portion of which extends from the bead 37. The extending portion of the attaching web is secured to the conveyor belt 15, adjacent the inner belt edge 36, by sewing or other means well known in the art.

When the belt turn 10 is operating, the belt retainer device, either 12 and 112, exerts a radially oriented force against the inner belt edge 36 to maintain the conveyor belt 15 in proper relative position on the end rollers 56 and to maintain proper belt tension. To properly transfer the radially oriented force to the conveyor belt 15, it is desirable that the conveyor belt 15 exhibit preferentially oriented stiffness. The conveyor belt 15 should be relatively stiff across the width W so that it flexes very little about axes parallel to the inner belt edge 36. However, the conveyor belt 15 should be relatively flexible about axes perpendicular to the inner belt edge 36 so that the conveyor belt 15 transitions properly about the end rollers 56.

The conveyor belt 15 may be preferentially stiffened by incorporating a known directional weave pattern of the fabric core 42 at the time of belt manufacture. This means of stiffening the conveyor belt 15 is very expensive. An alternative means for stiffening the conveyor belt 15 is by incorporating into the conveyor belt structure reinforcing stays 40 which function in a manner similar to corset stays. The reinforcing stays 40 may be molded into a top layer of urethane or polyester applied over the outer surface of the conveyor belt 15, which is shown in FIG. 8a. This method of stiffening will result in a conveyor belt 15 having a wavy upper surface. In some package handling situations a contoured upper surface, such as the wavy surface or a surface with other features, may enhance package transfer efficiency of the conveyor belt by increasing friction between the belt and the packages. Alternatively, the reinforcing stays 40 may be disposed between opposed layers of the fabric core 42 with spacing material 41 inserted between the stays 40 as shown in FIG. 8b. This composite structure receives top and bottom layers 43 of a polymer, by dipping or extrusion, yielding a reinforced conveyor belt 15 having substantially parallel and flat faces.

The reinforcing stays 40 may be rods or bars having round, oval, square, rectangular or other cross-sectional shapes. The reinforcing stays 40 may be fabricated of metal, such as steel, plastic or resin impregnated fiber glass, carbon or aramid fibers. The material selection depends to a great extent on the material load ratings and the particular belt retainer employed.

The guide rail assembly 18 comprises an inner rail 86, supported on portions of the input conveyor and output conveyors, 11 and 13. An outer guide rail 88 is supported by portions of the infeed and outfeed conveyors, 11 and 13, and the support frame 14. The guide rails 86 and 88 cooperate to maintain packages P on a defined portion of the conveyor belt 15. A feature of the belt turn 10 is that various conveying widths may be accommodated by providing conveyor belts 15 having prescribed widths W and a fixed diameter central aperture 34, or by adjusting the distance between the guide rails 86 and 88.

Looking now at FIG. 3, there is shown a side view of the sheave belt retainer 12. The sheave belt retainer 12 includes a dual sheave assembly 90 supported by a sheave support assembly 92.

The dual sheave assembly 90 comprises a vertical shaft 94, a carrying side sheave 96 and a return side sheave 98. The sheaves 96 and 98 are supported for rotation about the shaft 94 in a conventional manner. Each sheave 96 and 98 includes a peripherally located sheave groove 100. The sheaves 96 and 98 are positioned on the shaft in spaced apart relation so that the sheaves 96 and 98 simultaneously engage the conveyor belt bead 37. The radius of the sheaves 96 and 98 is made equal to the radius of curvature of the central aperture 34 of the conveyor belt 15 so there is substantial engagement of the sheave groove 100 with the bead 37 through an arc β shown in FIG. 1. The radius of the bead 37 is sized to cooperate with the radius of curvature of the sheave groove 100 so that the bead 37 disengages the groove 100 at the conveyor belt transition point adjacent the end rollers 56 without significant wear or drag on the bead 37. Also, the depth of the groove 100 is relatively shallow so that the bead 37 need only deform or deflect slightly to disengage the groove 100 at the conveyor belt transition point.

The sheave support assembly 92 includes a support platform 102 supported by a leg 103. The sheave support assembly 92 further includes a hinged shaft fixture 104, supported in adjustable engagement with the support platform 102, and a belt positioning means. The belt positioning means includes, alternatively, a yoke positioning assembly 106, or a spring positioning assembly 108, shown in phantom lines in FIG. 3.

The hinged support fixture 104 includes a fixture base 110, an upwardly extending boss 114, a shaft receiving ting 116 and a hinge 118, hingedly attaching the upwardly extending boss 114 and the shaft receiving ring 116. The fixture base 110 is held in engagement with the support platform 102 by nut and bolt assemblies 136. The hinge 118 is oriented with respect to the belt turn support structure 14 such that the dual sheave assembly 90 is capable of rotating away from the support frame 14 when the hinge 118 is articulated.

The yoke positioning assembly 106 comprises a yoke 120 fixedly engaged with the shaft 94, a tension adjusting shaft 122 having a threaded portion 123 at one end of the shaft 122, and a stop nut 124. The shaft 122 is inserted through an opening in the yoke 120 and the nut 124 is threaded onto the shaft 122 to retain the end of the shaft within the yoke 120. An opposite end of the shaft 122 extends through an aperture defined through the support beam 20, and is journaled for rotation but held against longitudinal motion in a known manner. A crank handle 128, shown in FIG. 2, is fixedly attached to the end of the shaft 122 adjacent the support beam 20. The crank handle 128 facilitates turning the shaft 122 to adjust the engagement of the threaded portion 123 of the shaft 122 with the nut 124. The nut 124 is sized and shaped so that exterior portions of the nut 124 interfere with the yoke 120 to prevent the nut 124 from mining when the shaft 122 is turned.

Where the yoke positioning assembly 106 is used with the belt turn 10, the support base 110 is disposed in sliding engagement with an upper surface 130 of the support platform 102. Sliding engagement of the support base 110 with the upper surface 130 may be accomplished by providing screw apertures 132 in the support base 110 and slots 134 in the support platform 102. The nut and bolt assemblies 136 are loosely fastened so that the support base 110 may slide, but does not tip, relative to the upper surface 130 of the support platform 102.

Conveyor belt retaining forces are applied to the bead 37 by the sheave belt retainer 12 by turning the crank handle 128 to adjust the engagement of the threaded portion 123 of the shaft 122 with the nut 124. This causes the dual sheave assembly 90 to move toward the conveyor belt 15 until the grooves 100 engage the bead 37. The crank handle 128 is turned until the conveyor belt 15 is forced into engagement with, and appropriately positioned on, the end rollers 56. A compression spring 138 may be disposed between the nut 124 and the yoke 120 so that the engagement of the sheave grooves 100 with the bead 37 is resilient rather than fixed. The resiliency allows the sheave grooves 100 to remain engaged with the bead 37 and hold the conveyor belt 15 in position within a limited range of wear and stretching of the conveyor belt 15 without having to adjust the position of the dual sheave assembly 90 with the crank handle 128.

The spring positioning assembly 108 includes a compression spring 140 supported in compressive engagement with the shaft 94 by a spring support bracket 142. The spring support bracket 142 is positioned on the support base 110 so that the spring 140 compressively engages the shaft 94 with a predetermined force, and is maintained in that position by hold down screws 143. Coarse adjustment of the dual sheave assembly 90 relative to the conveyor belt 15 may be made by adjusting the fixture base 110 relative to the support platform 102 and then securing the fixture base 110 by tightening the nut and bolt assemblies 136.

When the spring positioning assembly 108 is employed as the conveyor belt 15 tensioning means, a gap 144, indicated by phantom lines, is provided between the shaft receiving ring 116 and the upwardly extending boss 114. The gap 144 allows the dual sheave assembly 90 to be held in contact with the bead 37 within a given range of belt wear and stretching before a coarse adjustment of the support base 110 relative to the support platform 102 must be made.

A damaged conveyor belt 15 is removed and a new conveyor belt 15 installed on the belt turn 10, as follows. Where a yoke positioning assembly 106 is used with the belt turn 10, the tension adjusting shaft 122 is turned to loosen and remove the engaging nut 124 from the threaded portion 123 of the shaft 122. The compression spring 138, if present, is removed and the dual sheave assembly 90 is rotated about the hinge 118 to remove the sheaves 96 and 98 from the plane of the conveyor belt 15. The conveyor belt 15 may then be slipped from engagement with the end rollers 56. A replacement conveyor belt 15 may then be reinstalled.

Where a spring positioning assembly 108 is used with the belt turn 10, a damaged conveyor belt 15 is removed by loosening the hold down screws 143 to release the tension applied to the conveyor belt 15 by the compression spring 140. The dual sheave assembly 90 is then rotated about the hinge 118 allowing the removal or installation of a conveyor belt 15.

The track belt retainer 112, shown in FIGS. 5, 6 and 9, includes an arcuate track 150 attached to an adjusting plate 152 mounted on the support platform 102. The adjusting plate 152 is adjustably and slidably mounted to the support platform 102 and secured with nut and bolt assemblies 136. The radius of curvature of the arcuate track 150 is substantially the same as that of the inner belt edge 36 of the conveyor belt 15. As shown in FIG. 7, the arcuate track 150 has formed in it an oblong oval shaped track groove 154 a prescribed width and depth in the convex face of the arcuate track 150.

The conveyor belt 15 is adapted for use with the track belt retainer 112 by first exposing stay ends 156 of the reinforcing stays 40 adjacent the inner belt edge 36 of the central aperture 34. The stay ends 156 may be exposed by removing belting material about the stay end 156 adjacent the inner edge 36. After the reinforcing stay ends 156 are exposed, ball casters 39, or other beating devices such as cam followers, are fit to each stay end 156. The ball caster 39 comprises a caster sleeve 160 having a caster ball cup 162 formed at one end and a stay receiving bore 163 at the opposite end. The caster ball cup 162 receives a ball bearing 164 which is held in captive yet rotatable engagement with the ball cup 162.

The conveyor belt 15, with ball casters 39 attached to all of the exposed stay ends 156, is set about the end rollers 56 which flattens the conveyor belt 15 and disposes the central aperture 34 in an arcuate, oblong oval shape. The arcuate track 150, with the convex face facing the conveyor belt 15, is moved into engagement with the ball casters 39 by guiding the ball casters 39 into the track groove 154. The adjusting plate 152 is then engaged with the support platform 102 with the nut and bolt assemblies 136. The ball bearing 164 of each ball caster 39 engages the bottom surface of the track groove 154. The caster sleeve 160 is also supported laterally along the sides of the track groove 154. The ball casters 39 and track groove 154 are appropriately lubricated to prevent excessive wear of the track groove 154 or the ball casters 39.

The track retainer 150 is then urged into compressive engagement with the ball casters 39. The engaging forces of the track retainer 150 on the ball casters 39 are transmitted through the reinforcing stays 40 to the conveyor belt 15 to force the conveyor belt 15 into engagement with the end rollers 56. The engaging force is applied by a track tension adjusting assembly 166 which is similar the sheave belt retainer adjusting assembly 106. The track tension adjusting assembly 166 comprises a tension adjusting shaft 167 having a threaded end 168 that extends through an aperture 169 in the track retainer 150. A lock nut 170 threads onto the threaded portion 168 of the shaft 167. A fixture 171 is attached to the arcuate track 150 and engages portions of the nut 170 to prevent the nut from rotating relative to the arcuate track 150 when the tension adjusting shaft 167 is turned relative to the nut 170. An opposite end of the shaft 166 extends through an aperture defined through the support beam 20 and is journaled for rotation but held against longitudinal motion in a known manner. A crank handle 174, shown in FIG. 5, is fixedly attached to the end of the shaft 167, adjacent the support beam 20, and facilitates turning the shaft 167 to adjust the engagement of the threaded portion 168 of the shaft 167 with the lock nut 170. The engagement of the lock nut 170 with the arcuate track 150 may be spring biased by disposing a compression spring 176 between the lock nut 170 and the arcuate track 150. The spring biasing allows the track retainer 150 to remain in compressive engagement with the ball casters 39 sufficient to maintain the conveyor belt 15 appropriately positioned on the end rollers 56 within a given range of conveyor belt 15 wear and stretching.

A conveyor belt 15 may be removed and/or replaced on a belt turn 110 utilizing the track belt retainer 112 by first disengaging the lock nut 170 from the tension adjusting shaft 167 and then removing the compression spring 176, if provided. The nut and bolt assemblies 136 are then loosened and removed. The arcuate track 150, with adjusting plate 152 attached, is urged away from engagement with the ball casters 39 and then removed from engagement with the support platform 102. The conveyor belt 15 may then be slipped from engagement with the end rollers 56 and another conveyor belt repositioned on the belt turn 10.

In view of the foregoing description of the preferred embodiment in its intended environment, other embodiments of the present invention will suggest themselves to those skilled in the art. Therefore, the scope of the present invention is to be limited only by the claims below and equivalents thereof.

We claim:

1. In a conveyor system, including a feed conveyor and an exit conveyor, a powered belt turn comprising:

a frusto-conically shaped conveyor belt, said conveyor belt defining a central aperture and having an inner belt edge adjacent said central aperture and an outer peripheral edge, said conveyor belt providing an upper conveyor belt surface for supporting material placed on said powered belt turn;

opposed end rollers positioned within said frusto-conically shaped conveyor belt for supporting said conveyor belt for rotation through an arcuate path;

a belt drive assembly operative to drive said conveyor belt around said end rollers;

a plurality of elongate stays extending radially across said conveyor belt and engaged therewith to stiffen said conveyor belt, each said stay extending beyond said inner edge to an extending end of said stay, and a stay bearing at the extending end of each said stay; and a conveyor belt retainer including a retaining track defining a generally oval groove, said stay bearings being received in said groove to hold said conveyor belt in engagement with said end rollers, while permitting relative movement between said retainer and said inner belt edge.

2. The apparatus of claim 1 further including retainer adjustment means for adjusting the position of said retainer relative to said end rollers to any of a plurality of positions relative to said end rollers.

3. The apparatus of claim 1 wherein said end rollers are tapered end rollers, said tapered end rollers being supported at a fixed angular displacement from one another and defining axes of rotation that are vertically displaced from the horizontal such that an upper edge of each of said end rollers is substantially horizontally oriented to support said upper conveyor belt surface in a substantially horizontal plane.

4. The apparatus of claim 1 wherein said end roller comprises a plurality of rollers mounted for rotation on a common shaft, each roller having the same outer diameter and being capable of rotating at independently of adjacent rollers in response to rotation of said conveyor belt.

5. The apparatus of claim 1 wherein at least one of said end rollers is a driven end roller, said driven end roller being driven by a power source to cause said conveyor belt to rotate about said end rollers.

6. The apparatus of claim 1 further including a guide rail assembly defining a material carrying area of said conveyor belt, said guide rail assembly being supported adjacent said conveyor belt upper carrying surface and being capable of causing material carried by said powered belt turn to be maintained within said material carrying area as the material is carried by said powered belt turn.

7. The apparatus of claim 6 wherein said guide rail assembly includes inner and outer guide rails supported above said conveyor belt at predetermined positions relative to said inner belt edge and said outer peripheral edge, respectively.

8. The apparatus of claim 1 wherein said upper conveyor belt surface is contoured.

9. The apparatus of claim 1, wherein said groove is defined in a curved surface of said retaining track, said curved surface being outwardly convex toward said central aperture of said belt.

10. The apparatus of claim 1 wherein said conveyor belt retainer comprises means for urging said retainer against said stay bearings to maintain said belt within a predetermined range of conveyor belt positions relative to said end rollers.

11. The apparatus of claim 1 wherein said conveyor belt retainer comprises a pivot assembly, said pivot assembly allowing said retaining track to be pivoted from a position in which said groove receives said stay bearings to a position outside the plane of said conveyor belt in which said groove is moved away from said stay bearings, to allow said conveyor belt to be removed from said end rollers of said powered belt turn.

12. The apparatus of claim 1, wherein said stays are embedded within material of said conveyor belt.

13. In a conveyor system, including a feed conveyor and an exit conveyor, a powered belt turn comprising:

a frusto-conically shaped, endless conveyor belt, said conveyor belt defining a central aperture and having an inner edge adjacent said central aperture and an outer peripheral edge, said conveyor belt disposed to provide an upper belt carrying side and a lower belt return side;

end rollers rotatably supported at opposed ends of said powered belt turn for supporting said conveyor belt for rotation through an arcuate path;

a belt drive assembly operative to drive said conveyor belt around said end rollers;

a conveyor belt retainer having an inner contact width that is selectively and substantially wholly engagable with said inner edge of said conveyor belt, said retainer being effective to prevent inward displacement of said conveyor belt relative to said end rollers; and means for guiding said retainer from a position engaging said conveyor belt to a position outside the plane of said conveyor belt to allow said conveyor belt to be removed from said powered belt turn.

14. The apparatus of claim 13 further including a reinforcing bead attached to said inner belt edge of said conveyor belt, said bead adapted to engage said conveyor belt retainer.

15. The apparatus of claim 14 wherein said conveyor belt retainer comprises a sheave assembly including an upper sheave and a lower sheave mounted for rotation relative to one another, each of said sheaves including an outer engaging edge adapted to engage said reinforcing bead and to rotate therewith as said conveyor belt rotates about said end rollers, said sheave assembly being adapted to apply a retaining force to said reinforcing bead to cause said conveyor belt to engage said end rollers at a selected location.

16. The apparatus of claim 15 wherein said sheave assembly further includes a vertically disposed shaft for supporting said upper and lower sheaves for rotation about said shaft; and wherein said conveyor belt retainer further includes a sheave support assembly comprising a support platform for supporting said shaft.

17. The apparatus of claim 16 wherein said sheave support assembly is an adjustable sheave support assembly.

18. The apparatus of claim 17 wherein said adjustable sheave support assembly is resiliently adjustable to maintain said upper and lower sheaves in resilient engagement with said reinforcing bead at a substantially constant force within a predetermined range of conveyor belt positions relative to said end rollers.

19. The apparatus of claim 13 wherein said end rollers are tapered end rollers, said tapered end rollers defining a rotation axis extending along the longitudinal centerline of said end rollers.

20. The apparatus of claim 19 wherein said rotation axes of said tapered end rollers are positioned at a slope so that said upper belt carrying side of said conveyor belt is disposed substantially in a horizontal plane.

21. The apparatus of claim 19 wherein said rotation axes of said tapered end rollers are disposed in a substantially horizontal plane so that said upper carrying surface of said conveyor belt is banked.

22. The apparatus of claim 13, wherein said conveyor belt retainer further comprises means for urging said retainer against said inner belt edge to maintain said belt within a predetermined range of conveyor belt positions relative to said end rollers.

23. The apparatus of claim 13, wherein said means for guiding said retainer comprises a pivot assembly allowing said retainer to be pivoted from a position engaging said conveyor belt to a position outside the plane of said conveyor belt.

* * * * *